UNITED STATES PATENT OFFICE.

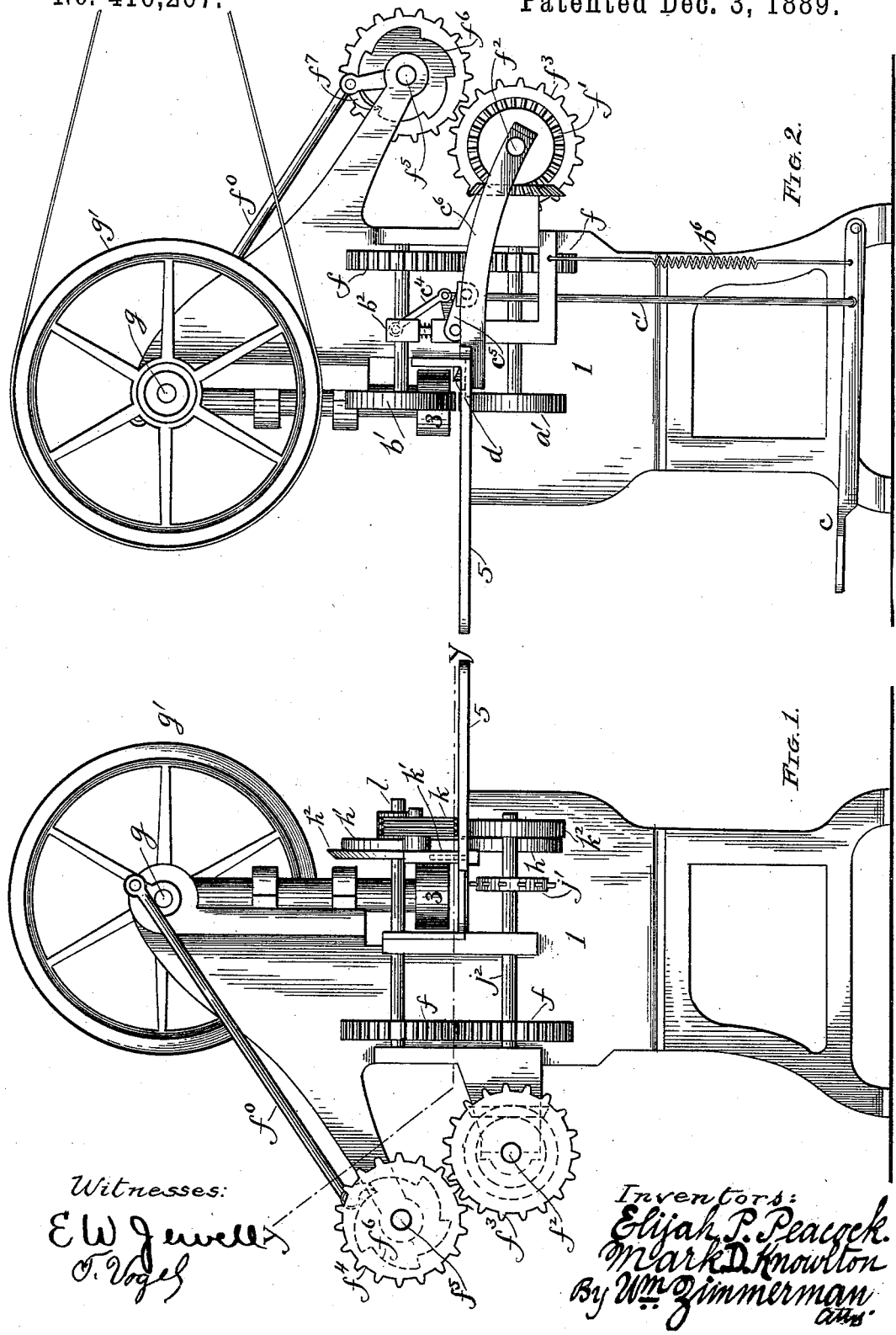

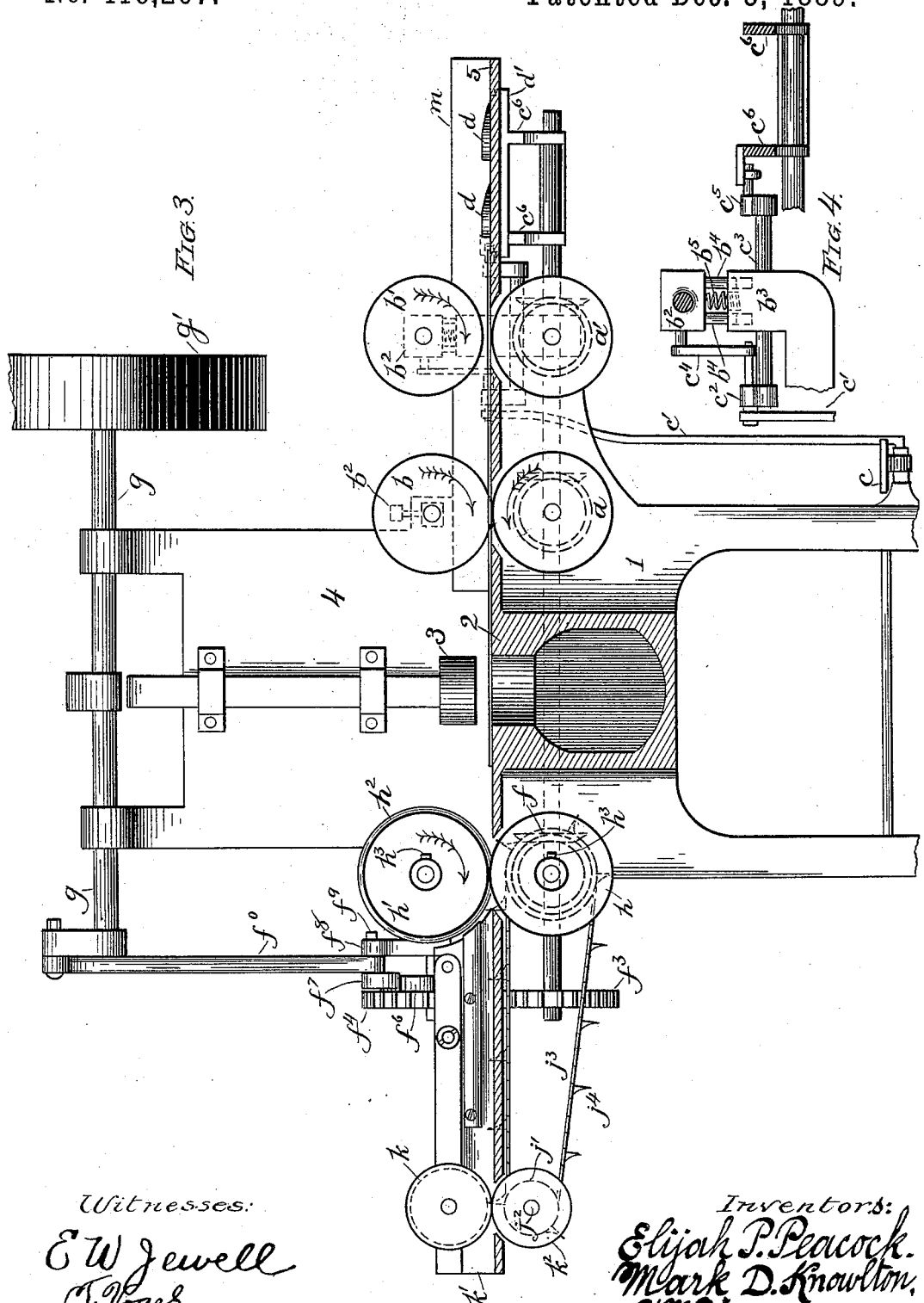

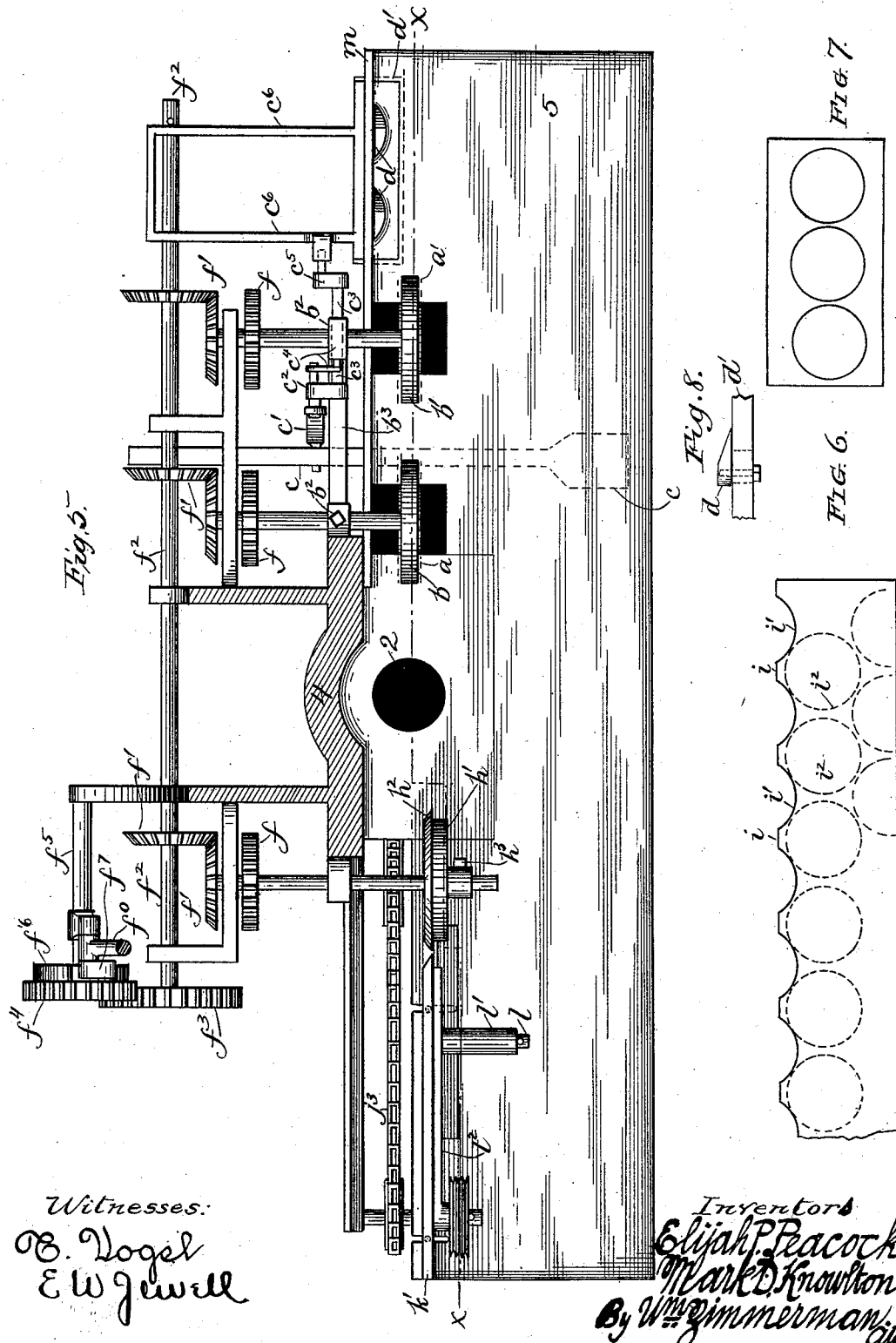

MARK D. KNOWLTON AND ELIJAH P. PEACOCK, OF CHICAGO, ILLINOIS.

MACHINE FOR CUTTING BLANKS FROM SHEETS.

SPECIFICATION forming part of Letters Patent No. 416,267, dated December 3, 1889.

Application filed August 24, 1888. Serial No. 283,671. (No model.)

*To all whom it may concern:*

Be it known that we, MARK D. KNOWLTON and ELIJAH P. PEACOCK, citizens of the United States, residing at Chicago, in the county of Cook and State of Illinois, have invented certain new and useful Improvements in Machines for Cutting Blanks from Sheets, which are fully set forth in the following specification, reference being had to the accompanying drawings, forming a part hereof, and in which—

Figure 1 shows our machine in elevation as seen from its left-hand end. Fig. 2 shows the same from its opposite or right-hand end. Fig. 3 shows the same in front elevation, the die under the punch and the table being shown in section on line $x\ x$ of Fig. 5. Fig. 4 shows in front elevation the details of a part of the mechanism shown in Fig. 3 with those parts which are in front and obscuring said details removed. Fig. 5 shows our machine in plan view with the parts above the line $y\ y$ shown in Fig. 1 removed. Fig. 6 shows a fragment of a sheet of straw-board in plan from which a series of circular disks have been cut and the remaining parts trimmed off, and a series of circles in broken lines indicating the position of the next succeeding series of disks to be cut at the next operation, and a series of half-circles, also in broken lines, to indicate the position of the next succeeding series to be cut. Fig. 7 is a diagram showing the usual manner of cutting and its waste of material. Fig. 8 shows a fragment of the plate $d'$, which is provided with a slot, indicated by the dotted lines, through which a bolt passes into the stop $d$, by means of which said stop may be adjusted and held at any desired place on said plate.

Like letters of reference refer to like parts throughout.

The object of our invention is to construct a machine to cut out circular or polygonal disks from straw-board or any other material in sheets, whereby the usual great waste is avoided to a much larger extent than heretofore accomplished; and to attain said end we construct our improved machine substantially as follows, namely:

To any well-known form of machine as the parts 1 2 3 4 5, constituting the base, die, punch-table, and frame-work above, to guide and hold the punch and its driving mechanism, we add the substantially following-described parts, namely: two rollers $a\ a'$, slightly projecting above the table 5, and directly over them two other and like rollers $b\ b'$. The roller $b'$ has on its shaft and bearing nearest said roller a loose block $b^2$, in which it turns. Said block is supported on an arm or support $b^3$, forming a part of the base 1, and is held in its place by means of dowel-pins $b^4$, and raised from its support by means of a spring $b^5$. By means of this arrangement the roller $b'$, is raised from the roller $a'$ far enough to readily admit the thickest sheets to be worked. Said rollers $a'\ b'$ are brought into operative contact by means of a treadle $c$, connected through a rod $c'$ to a crank or lever $c^2$ on a shaft $c^3$, turning in the support $b^3$, from which a connecting-link $c^4$ rises and is at its other end united to the block $b^2$. The said treadle $c$ may also be raised by a spring $b^6$ and the rod $c'$ by direct connection with the block $b^2$ be made to perform the functions of the previously-described mechanism; but by extending the shaft $c^3$ through the support $b^3$ and attaching to its outer end another crank or lever $c^5$, connected to one of the levers $c^6$, so as to rest upon it, as plainly shown in Figs. 4 and 5, said levers $c^6$ may be operated by said treadle and through it the adjusting block or blocks $d$, which are secured upon a plate $d'$, carried upon the outer ends of the arms $c^6$. Said arms $c^6$ are connected rigidly at their rear ends by a cross-piece, so as to cause all the parts to operate together, and are carried at their ends on the projecting end of a shaft, as shown. Said plate $d'$ passes through the table 5 and has shoulders or other suitable stops, which keep its surface on the same bevel with the table 5. Said rollers $a\ b\ a'\ b'$ have positive rolling contact through the equal-diameter gears $f\ f$ on their shafts, and to either set of their shafts (in this case the lower one) are attached equal-sized bevel-gears $f'$, all driven by a shaft $f^2$, which extends into and is fastened to the gear-wheel $f^3$. Said wheel $f^3$ gears into a wheel $f^4$ on a shaft $f^5$, supported by suitable brackets above the wheel $f^3$. On the inner side of the gear-wheel $f^4$ is a ratchet-wheel $f^6$, on which plays a pawl $f^7$, secured in this case to the same pin $f^9$ which actuates the lever $f^8$, secured to the shaft $f^5$, and to which one end of the pitman-rod $f^6$ is attached, the other end thereof being connected to a crank on the driving-shaft $g$, actuated by a pulley and belt $g'$ from any suitable driving mechanism. On the opposite side of the punch 3 and on the same shaft $f^2$, and actuated by like bevel and straight gear $f'$ and $f$ and driving similar but longer shafts, are a pair of rollers $h\ h'$, of equal diameter with the rollers $a\ b\ a'\ b'$. Said rollers $h\ h'$ are adjustable longitudinally on their shaft, and the upper one is provided with a beveled roller or cutter disk $h^2$, which with its sharp edge works closely against the rear side of the lower roller, thereby forming a rotary cutter or shear of well-known form, which trims the punched stock as it passes under it into the form shown at the upper edge of Fig. 6, in which case circular plates are cut. Said disks are adjusted and secured on their shafts by means of set-bolts $h^3$.

The object of making the rollers $h\ h'$ adjustable, as stated, is to cut the projections $i$ of proper length for each size of disks cut.

On the shaft of the roller $h$ is a sprocket-wheel $j$, of somewhat smaller diameter than the roller $h$, and on it is an endless chain belt $j^3$, carried at its opposite end on a sprocket-wheel $j'$ on a shaft $j^2$, secured under the table 5. Said chain belt has spurs $j^4$, which serve to rake out the trimmings as they fall from the cutter $h^2$, and on the outer end of said shaft $j^2$ is a guide-roller $k^2$, also longitudinally adjustable on its shaft, (as already described and shown for the rollers $h\ h'$,) which also projects through a hole in the table 5, and upon it plays a roller $k$, adjustably attached to the back $k'$, which said back is an upright plate of metal adjustably secured on the table 5, and of which its front face is in line with the front face of the cutter $h^2$, and of which the end toward the cutter $h^2$ is cut on a bevel, so as to throw the clippings back upon the chain belt $j^3$, and said beveled edge is also curved in an arc with said cutter $h^2$ until it meets the surface of the table 5. Said back $k'$ may be made adjustable in any suitable way, as by slots across the table and through them, the back held by screw-bolts passed into it from below, as shown in Figs. 1 and 5. Near the upper edge of said back and at some distance from the wheel $k$ is a pin, upon which is loosely secured a sleeve $l'$, of which the rear end is attached to a flat bar $l^2$, playing against the back $k'$ and provided at its outer end with a pin, upon which plays the roller $k$. By this means the said roller becomes self-adjusting to the varying thicknesses of straw-board passed under it, which thus presses upon it with its own weight and that of the bar $l^2$, and which by means of the circumferential sharp V-shaped edges cut into the periphery of said roller holds the trimmed stock secure from slipping away laterally as it moves, and is guided along the face of the back $k'$.

From the back edge of the table 5 rises a vertical back or stop $m$, against which the edge of the sheet to be cut is held when put into the machine. After the sheet has passed through the machine the first time the waste trimmed from it leaves the blunt points $i$, Fig. 6, in a right line, and between them the circular arcs $i'$, and when the sheet is returned to be fed into the machine its front end is placed so as to be caught between the rollers $a'\ b'$, and at the same time so that one or more of the stops $d$ rest in said arcs or notches. By this means the sheet is so fed under the punch as to cause it to cut out the "blanks" $i^2$, as indicated by the circles in broken lines, (shown in Fig. 6,) thus leaving but very little waste material between the consecutive circles, as may be seen by comparing Figs. 6 and 7.

The stops $d$ are cut down to the bevel of the base on which they stand on the side opposite to that looking toward the punch. This permits the sheet to slip over said stops after it is started by the rollers $a'\ b'$, which becomes necessary when the treadle is released, and thereby the stops $d$ allowed to rise; but which can only be done after the rollers $a'\ b'$ have begun to operate. Previous to this the stops $d$ are depressed by the treadle; but they must not be depressed until after the sheet has been properly placed and stopped by them.

When a sheet of material to be cut is placed as described, the rollers $a'\ b'$ are brought upon it and held until it has fully passed under the rollers $a\ b$, which will then feed it under the punch and into the rollers and cutter $h\ h'\ h^2$, and said rollers $h\ h'$ will pull the sheet through under the die and cutter to the end.

It is evident that the relative distance between the punch 3 and stop or stops $d$, which are made adjustable, must be adjusted for each size of blanks; also, that the degree of motion of the feed-rollers must be varied accordingly. The latter point is attained by replacing the gear-wheels $f^3\ f^4$ with another set of the desired proportion. The stop may consist of one or more parts $d$ and operate equally well; but the said part is not indispensable, since a mark on the table, or, preferably, on the guide $m$, would show the operator where to place the point $i$ of the sheet. Again, since the rollers $h\ h'\ h^2$ are both feed and trimming rollers, they, in connection with the guide $m$ and punch, may be made to operate, and this arrangement may further be improved by making the roller $h'$ adjustable by the mechanism now shown and used for the roller $b'$, the punch being started and stopped by any of the well-known forms of clutch mechanism used in die-presses.

The blanks cut from the sheet are here shown to be circular; but it is evident that the principle of the mechanism and its mode of operation are the same for any material or metal in the form of sheets as well as for straw-board, &c. The guide $m$ may also be made adjustable, if desired, by any well-known mechanism, as by such as shown for the guide $k'$.

Instead of changing both the gears $f^3 f^4$, it is preferable to change only the upper one $f^4$, and for that purpose its shaft must then, in some well-known manner, be made adjustable to the changed diameter of the replaced wheel.

In Fig. 7 is shown a short strip of strawboard in the old form of working it. Then the board was cut into strips wide enough to insure cutting the blanks from it, which left considerable of a margin of waste, and also much material wasted between the cut-out parts.

What we claim is—

1. In a machine for cutting blanks from sheets, a punch and die and a table provided with a guide $m$ and a stop $d$, in combination with intermittently-operating mechanism to feed the material in uniform spaces to said punch, trimming devices to trim the punched stock, so as to adapt it to operate in connection with said stop and guide, and mechanism to connect and actuate said punch-feed mechanism and trimming devices, substantially as specified.

2. In a machine for cutting blanks from sheets, a punch and die and a table provided with a guide vertical to the plane of the table and parallel to the plane of motion of the sheet, and an adjustable stop in front of said guide, in combination with intermittently-operating and uniformly - spacing feeding mechanism actuated by a revolving shaft and a reciprocating rod, and trimming mechanism to trim the punched stock, so as to adapt it to operate in connection with said stop, guide, punch, and trimming mechanism, substantially as specified.

3. In a machine for cutting blanks from sheets, a punch and table provided with a guide $m$ and a stop and a guide $k'$, in combination with rollers to feed the material under the punch and trimming mechanism to trim it, substantially as specified.

4. In a machine for cutting blanks from sheets, a punch, die, and table provided with a guide $m$ and a stop, in combination with feed-rollers $a$ $b$, trimming-rollers $h$ $h^2$, and mechanism by means of which said punch, feed-rollers, and trimming-rollers are connectedly operated, substantially as specified.

5. In a machine for cutting blanks from sheets, a punch, die, and table provided with a guide $m$ and a stop for adjusting the sheets, in combination with feed and trimming rollers $h$ $h'$ $h^2$, guide-rollers $k$ $k^2$, and mechanism to connect and actuate said punch, feed, trimming, and guide rollers, substantially as specified.

6. In a machine for cutting blanks from sheets, a punch, die, and table provided with guides $k'$ and $m$ and a stop $d$, in combination with feed-rollers and trimming mechanism $h$ $h'$ $h^2$, and mechanism to connect and actuate said punch, feed, trimming, and guide mechanism, substantially as specified.

7. In a machine for cutting blanks from sheets, a punch, die, and table provided with guides $k'$ and $m$ and a stop $d$, in combination with feed and trimming rollers $h$ $h'$ $h^2$ and guide $k$ $k^2$, and mechanism to connect and actuate said punch, feed, trimming, and guide rollers, substantially as specified.

8. In a machine for cutting blanks from sheets, a punch, die, and table provided with a guide $m$ and a stop, in combination with the feed-rollers $a$ $b$ and the rollers $h$ $h'$, and trimming device, and mechanism to connect and actuate said punch, feed, and trimming mechanism, substantially as specified.

9. In a machine for cutting blanks from sheets, a punch and table provided with a guide $m$ and a stop and a guide $k'$, in combination with the feed-rollers $a$ $b$ $a'$ $b'$ and the feed and trimming rollers $h$ $h'$ $h^2$, substantially as specified.

10. In a machine for cutting blanks from sheets, a punch and table provided with a guide $m$ and an adjustable stop, in combination with rollers to feed the material under the punch, an interchangeable gear adapted to operate with said adjustable stop, whereby the sheets may be so fed as to form varying sizes of blanks, and mechanism to connect and actuate said punch, feed-rollers, and interchangeable gears, substantially as specified.

11. In a machine for cutting blanks from sheets, the interchangeable gear-wheels $f^3 f^4$ and pawl and ratchet operating them, in combination with an adjustable stop, a punch and die and table provided with a guide $m$, mechanism to feed the material under the punch, mechanism to trim the punched sheet, and mechanism to connect and actuate said punch, feeding, and trimming mechanism, substantially as specified.

12. In a machine for cutting blanks from sheets, a punch and table provided with a guide $m$ and an adjustable stop $d$, in combination with the interchangeable gear-wheels $f^3 f^4$ and pawl, feed-rollers to feed the material under said punch, and mechanism to trim the punched sheets, and mechanism to connect and actuate said punch, gear-wheels, feed-rollers, and trimming devices, substantially as specified.

13. In a machine for cutting varying-sized blanks from sheets, the varying-speed driving-gears $f^3 f^4 f^6$, in combination with an adjustable stop, a punch and die, and table provided with a guide $m$, and feed mechanism actuating said sheets and trimming devices, and mechanism to connect and actuate said driving-gear, punch, and feed and trimming mechanism, substantially as specified.

14. In a machine for cutting blanks from sheets, the combination of a punch, die, and table provided with a guide $m$, the stop or stops $d$, feed-rollers $a'$ $b'$, and mechanism to separate and to press said rollers $a'$ $b'$ together, roller $h\ h'$ and cutter $h^2$, reciprocating ratchet $f^7$, ratchet-wheel $f^6$, gear-wheels $f^3\ f^4$, and the mechanism to actuate said parts, substantially as specified.

15. In a machine for cutting blanks from sheets, the combination of a punch, die, and table provided with an adjustable guide $k'$ and rollers to feed the sheets to said punch, the rollers $h\ h'$ and cutter $h^2$, and chain with spurs, and the mechanism to actuate said parts, substantially as specified.

16. In a machine for cutting blanks from sheets, a table provided with adjustable stops, a guide for feeding to feed-rollers and roller for feeding to the punch, rotary rollers for drawing the sheets from the punch, rotary cutter for trimming said sheet, a guide $k'$ beyond the cutter, a roller with V-shaped circumferential edges, and mechanism to actuate said parts, substantially as specified.

17. In a machine for cutting blanks from sheets, a table provided with a punch and die, and a guide vertical to it and in a plane behind the punch and parallel to the plane of motion of the sheet, in combination with trimming mechanism situated in a plane parallel to said guide and between the center and perimeter of the front half of the punch to receive and trim the punched sheets, substantially as specified.

18. In a machine for cutting blanks from sheets, a table provided with a punch and die, and a guide vertical to it and in a plane behind the punch and parallel to the plane of motion of the sheet, and a stop in front of said guide, in combination with trimming mechanism situated in a plane parallel to said guide and between the center and perimeter of the front half of the punch to receive and trim the punched sheets, substantially as specified.

MARK D. KNOWLTON.
ELIJAH P. PEACOCK.

Witnesses:
WM. ZIMMERMAN,
C. VOGEL.